US011607959B2

(12) United States Patent
Sakata et al.

(10) Patent No.: US 11,607,959 B2
(45) Date of Patent: Mar. 21, 2023

(54) ON-BOARD ELECTRICAL SYSTEM

(71) Applicant: SUBARU CORPORATION, Tokyo (JP)

(72) Inventors: Shinnosuke Sakata, Tokyo (JP); Kazuki Makino, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 566 days.

(21) Appl. No.: 16/678,259

(22) Filed: Nov. 8, 2019

(65) Prior Publication Data

US 2020/0207210 A1    Jul. 2, 2020

(30) Foreign Application Priority Data

Dec. 26, 2018  (JP) .............................. JP2018-243659

(51) Int. Cl.
*B60L 3/00* (2019.01)
*B60L 58/20* (2019.01)
*H02J 7/14* (2006.01)

(52) U.S. Cl.
CPC ............ *B60L 3/0046* (2013.01); *B60L 3/003* (2013.01); *B60L 58/20* (2019.02); *H02J 7/14* (2013.01)

(58) Field of Classification Search
CPC ........ B60L 3/0046; B60L 58/20; B60L 3/003; H02J 7/00; H02J 7/0003; H02J 7/00047; H02J 7/14
See application file for complete search history.

(56) References Cited

U.S. PATENT DOCUMENTS

| | | | | |
|---|---|---|---|---|
| 10,910,834 | B2* | 2/2021 | Capp | H02M 3/04 |
| 2009/0001926 | A1* | 1/2009 | Sato | B60L 3/003 |
| | | | | 320/102 |
| 2009/0038902 | A1* | 2/2009 | Yechuri | E01C 9/00 |
| | | | | 404/1 |
| 2012/0123625 | A1* | 5/2012 | Ueo | B60L 50/16 |
| | | | | 701/22 |
| 2015/0097527 | A1* | 4/2015 | DeDona et al. | B60L 53/18 |
| | | | | 320/109 |

(Continued)

FOREIGN PATENT DOCUMENTS

| | | | |
|---|---|---|---|
| CN | 201296180 Y | * | 8/2009 |
| CN | 107650853 A | * | 2/2018 |

(Continued)

OTHER PUBLICATIONS

Office Action issued in Japanese Application No. 2018-243569 dated Oct. 4, 2022; with English machine translation; 10 pages.

*Primary Examiner* — James A Shriver, II
*Assistant Examiner* — Michael T. Walsh
(74) *Attorney, Agent, or Firm* — Troutman Pepper Hamilton Sanders LLP

(57) ABSTRACT

An on-board electrical system includes a motor generator, a high-voltage battery, an electric power acquirer, an auxiliary subsystem, first and second step-down units, and a controller. The electric power acquirer is able to acquire electric power during travel of a vehicle, and able to feed acquired electric power to the high-voltage battery. The auxiliary subsystem includes an auxiliary battery and auxiliary machinery. The controller determines whether or not magnitude of a load on the auxiliary battery is equal to or greater than predetermined magnitude. On the condition that the magnitude of the load is equal to or greater than the predetermined magnitude, the controller allows electric power from the electric power acquirer to be fed to the auxiliary subsystem through the second step-down unit.

1 Claim, 8 Drawing Sheets

(56) References Cited

U.S. PATENT DOCUMENTS

| | | | |
|---|---|---|---|
| 2015/0246614 A1* | 9/2015 | Dames | B60L 5/005 |
| | | | 191/10 |
| 2015/0291052 A1 | 10/2015 | Nakazawa | |
| 2015/0349582 A1* | 12/2015 | Maeno | B60L 58/20 |
| | | | 320/101 |
| 2016/0089981 A1* | 3/2016 | Kodawara | B60L 50/40 |
| | | | 903/903 |
| 2017/0259687 A1* | 9/2017 | Chikkannanavar | |
| | | | H02J 7/00308 |
| 2018/0072180 A1* | 3/2018 | Wu | H02J 7/0049 |
| 2018/0241095 A1* | 8/2018 | Nozaki | H01M 10/46 |

FOREIGN PATENT DOCUMENTS

| | | | | |
|---|---|---|---|---|
| JP | 05111112 A | * | 4/1993 | ......... B60L 11/1868 |
| JP | H10125359 A | | 5/1998 | |
| JP | 2004173395 A | | 6/2004 | |
| JP | 2007-228753 A | | 9/2007 | |
| JP | 2007228753 A | * | 9/2007 | ............. B60L 3/003 |
| JP | 2015-82866 A | | 4/2015 | |
| JP | 2015073380 A | | 4/2015 | |
| JP | 2015082866 A | * | 4/2015 | |
| JP | 2015-98302 A | | 5/2015 | |
| JP | 2015098302 A | * | 5/2015 | |
| JP | 2015104143 A | | 6/2015 | |
| JP | 2016084121 A | | 5/2016 | |
| JP | 6065920 B2 | | 1/2017 | |
| JP | 2017205009 A | | 11/2017 | |
| JP | 2018170854 A | | 11/2018 | |

* cited by examiner

ON-BOARD ELECTRICAL SYSTEM

CROSS-REFERENCE TO RELATED APPLICATIONS

This application claims priority from Japanese Patent Application No. 2018-243659 filed on Dec. 26, 2018, the entire contents of which are hereby incorporated by reference.

BACKGROUND

The technology relates to an on-board electrical system including a motor generator and a high-voltage battery.

For example, electrically powered vehicles such as hybrid electric vehicles (HEVs) are provided with motor generators that serve as driving sources of wheels when powering and as generators when regenerating.

Some vehicles of this kind include a high-voltage battery. The high-voltage battery is subject to charging with electric power generated by the motor generator. Meanwhile, the high-voltage battery is configured to serve as a power supply of the motor generator when the motor generator is powering.

Some vehicles including the high-voltage battery have a configuration in which power feeding is performed from the high-voltage battery to an auxiliary subsystem through a DC/DC converter. The auxiliary subsystem means an electrical system including an auxiliary battery and auxiliaries. An output voltage of the auxiliary battery is lower than that of the high-voltage battery. The auxiliaries are fed with electric power by the auxiliary battery.

As to the existing related techniques, reference can be made to Japanese Unexamined Patent Application Publication (JP-A) Nos. 2007-228753, 2015-82866, and 2015-98302, and Japanese Patent No. 6065920.

SUMMARY

An aspect of the technology provides an on-board electrical system including a motor generator, a high-voltage battery, an electric power acquirer, an auxiliary subsystem, a first step-down unit, a second step-down unit, and a controller. The motor generator is configured to perform powering operation to drive one or more wheels of a vehicle, and configured to perform regenerative operation to generate electric power. The high-voltage battery is subject to charging with electric power generated by the motor generator, and configured to feed electric power to the motor generator engaged in the powering operation. The electric power acquirer is able to acquire electric power during travel of the vehicle, and able to feed acquired electric power to the high-voltage battery. The auxiliary subsystem includes an auxiliary battery and auxiliary machinery to be fed with electric power by the auxiliary battery. An output voltage of the auxiliary battery is lower than an output voltage of the high-voltage battery. The first step-down unit is configured to step down the output voltage of the high-voltage battery, and able to supply the stepped-down output voltage of the high-voltage battery to the auxiliary subsystem. The second step-down unit is configured to step down the output voltage of the electric power acquirer, and able to supply the stepped-down output voltage of the electric power acquirer to the auxiliary subsystem. The controller is configured to control power feeding from the high-voltage battery and from the electric power acquirer. The controller is configured to determine whether or not magnitude of a load on the auxiliary battery is equal to or greater than predetermined magnitude. On the condition that the magnitude of the load is equal to or greater than the predetermined magnitude, the controller is configured to allow electric power from the electric power acquirer to be fed to the auxiliary subsystem through the second step-down unit.

An aspect of the technology provides an on-board electrical system including a motor generator, a high-voltage battery, an electric power acquirer, an auxiliary subsystem, a first step-down unit, a second step-down unit, and a controller. The motor generator is configured to perform powering operation to drive one or more wheels of a vehicle, and configured to perform regenerative operation to generate electric power. The high-voltage battery is subject to charging with electric power generated by the motor generator, and configured to feed electric power to the motor generator engaged in the powering operation. The electric power acquirer is able to acquire electric power during travel of the vehicle, and able to feed acquired electric power to the high-voltage battery. The auxiliary subsystem includes an auxiliary battery and auxiliary machinery to be fed with electric power by the auxiliary battery. An output voltage of the auxiliary battery is lower than an output voltage of the high-voltage battery. The first step-down unit is configured to step down the output voltage of the high-voltage battery, and able to supply the stepped-down output voltage of the high-voltage battery to the auxiliary subsystem. The second step-down unit is configured to step down the output voltage of the electric power acquirer, and able to supply the stepped-down output voltage of the electric power acquirer to the auxiliary subsystem. The controller is configured to control power feeding from the high-voltage battery and from the electric power acquirer. The controller is configured to determine whether or not a state of charge of the high-voltage battery is equal to or smaller than a threshold. On the condition that the state of charge of the high-voltage battery is equal to or smaller than the threshold, the controller is configured to stop the power feeding from the electric power acquirer to the auxiliary subsystem through the second step-down unit, and to allow the electric power acquirer to charge the high-voltage battery.

An aspect of the technology provides an on-board electrical system including a motor generator, a high-voltage battery, an electric power acquirer, an electric motor, and a controller. The motor generator is configured to perform powering operation to drive one or more wheels of a vehicle, and configured to perform regenerative operation to generate electric power. The high-voltage battery is subject to charging with electric power generated by the motor generator, and configured to feed electric power to the motor generator engaged in the powering operation. The electric power acquirer is able to acquire electric power during travel of the vehicle, and able to feed acquired electric power to the high-voltage battery. The electric motor is configured to operate with the high-voltage battery as a power supply. The controller is configured to control power feeding from the high-voltage battery and from the electric power acquirer. The controller is configured to determine whether or not magnitude of power consumption of the electric motor is equal to or greater than predetermined magnitude. On the condition that the magnitude of the power consumption is equal to or greater than the predetermined magnitude, the controller is configured to stop the charging of the high-voltage battery by the electric power acquirer, and to allow electric power from the electric power acquirer to be fed to the electric motor.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
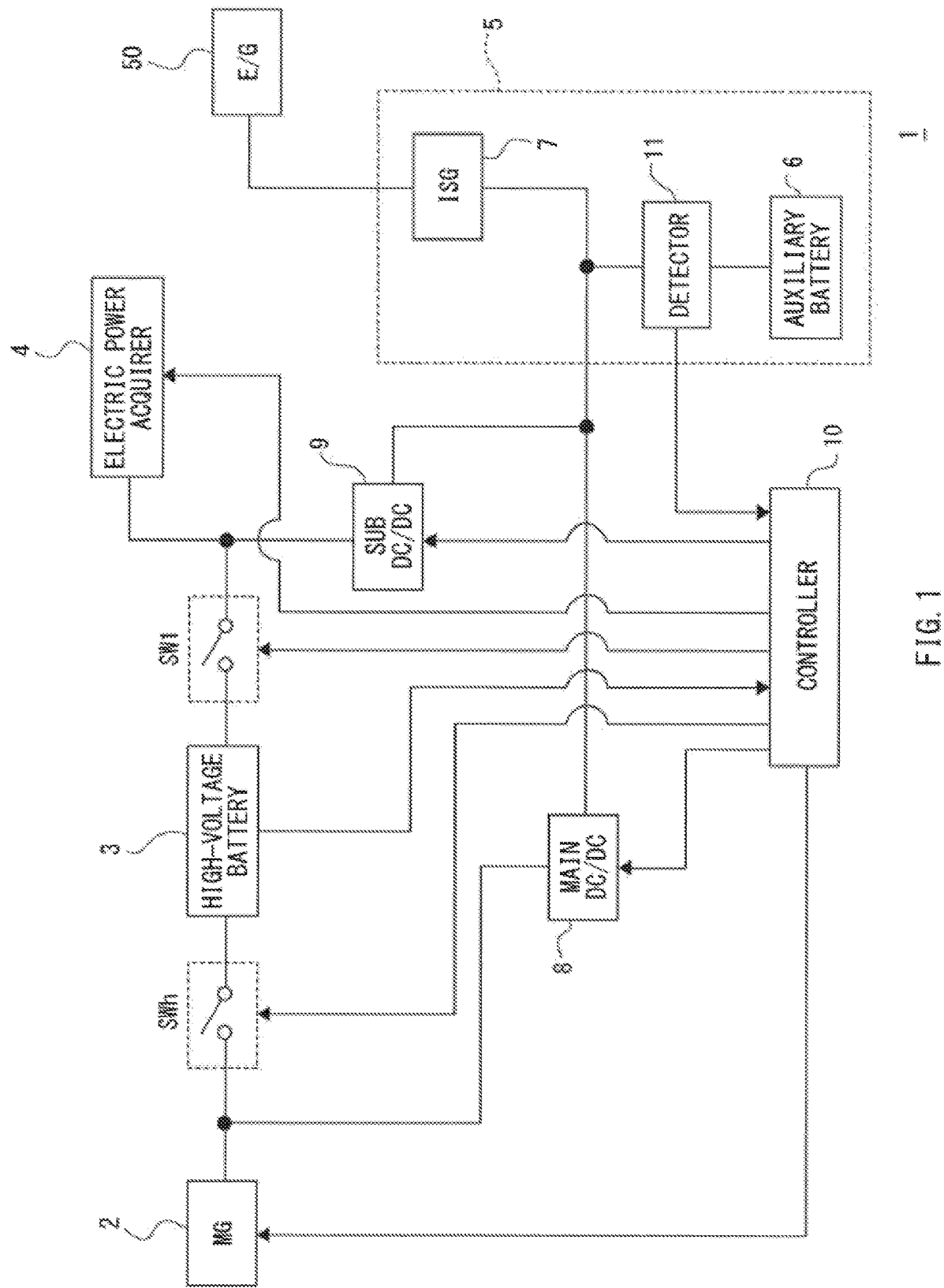
FIG. 1 is a circuit block diagram illustrating a configuration example of an on-board electrical system according to a first embodiment of the technology.

With a configuration in which power feeding is performed from a high-voltage battery to an auxiliary subsystem through a DC/DC converter, electric power is taken out from the high-voltage battery, not only by a motor generator but also by the auxiliary subsystem. This contributes to higher frequency of take-out of electrical power from the high-voltage battery, causing possibility of deterioration in the high-voltage battery. In addition, because electric power is also taken out by the auxiliary subsystem, there is possibility of shortage of driving electric power of the motor generator.

It is desirable to provide an on-board electrical system that makes it possible to suppress deterioration in a high-voltage battery that supplies driving electric power to a motor generator, and to prevent occurrence of shortage of the driving electric power of the motor generator, in a vehicle that is able to perform power feeding from the high-voltage battery to an auxiliary subsystem.

In the following, some preferred but non-limiting embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

1. First Embodiment

FIG. 1 is a circuit block diagram illustrating a configuration example of an on-board electrical system 1 according to a first embodiment of the technology.

The on-board electrical system 1 according to this embodiment is installed in a vehicle. The vehicle may be a hybrid electric vehicle (HEV) including an engine (E/G) 50 and a motor generator (MG) 2. The engine 50 and the motor generator 2 may serve as driving sources of one or more wheels of the vehicle.

The motor generator 2 is configured to perform powering operation to drive the one or more wheels of the vehicle, and configured to perform regenerative operation to generate electric power.

The on-board electrical system 1 includes the motor generator 2, a high-voltage battery 3, an electric power acquirer 4, an auxiliary subsystem 5, a main DC/DC converter 8, a sub DC/DC converter 9, and a controller 10. The on-board electrical system 1 may further include a relay switch SWh and a first switch SW1. The high-voltage battery 3 is subject to charging with electric power generated by the motor generator 2, and is configured to feed electric power to the motor generator 2 engaged in the powering operation. The electric power acquirer 4 is able to acquire electric power during travel of the vehicle, and is able to feed acquired electric power to the high-voltage battery 3. The auxiliary subsystem 5 includes, for example but not limited to, an auxiliary battery 6. The auxiliary battery 6 may include, for example, a lead storage battery, without limitation. The main DC/DC converter 8 is able to step down an output voltage of the high-voltage battery 3, and is able to supply the stepped-down output voltage of the high-voltage battery 3 to the auxiliary subsystem 5. The sub DC/DC converter 9 is able to step down an output voltage of the electric power acquirer 4, and is able to supply the stepped-down output voltage of the electric power acquirer 4 to the auxiliary subsystem 5. The controller 10 is configured to control power feeding from the high-voltage battery 3 and from the electric power acquirer 4.

The high-voltage battery 3 may include a plurality of battery cells including secondary batteries such as lithium ion batteries and nickel metal hydride batteries. A rated output voltage of the high-voltage battery 3 may be, for example, about several hundred volts (V).

On the high-voltage battery 3, mounted may be an IC (Integrated Circuit) chip that detects a state of charge (SOC), or a charging rate. The IC chip may be communicably coupled to the controller 10, allowing the controller 10 to be able to acquire the SOC of the high-voltage battery 3.

The relay switch SWh may include a relay, or an electromagnetic relay, inserted between the high-voltage battery 3 and the motor generator 2. The relay switch SWh may be able to establish and interrupt electrical coupling between the high-voltage battery 3 and the motor generator 2. Owing to the relay switch SWh, it is possible to make ON/OFF switching of the charging of the high-voltage battery 3 with electric power obtained by the motor generator 2 engaged in the regenerative operation, and ON/OFF switching of the power feeding from the high-voltage battery 3 to the motor generator 2 engaged in the powering operation.

In this example, the electric power acquirer 4 may acquire electric power by performing electric power reception from outside the vehicle. In one specific but non-limiting example, an electromagnetic induction method may be employed as a power receiving method. In the electromagnetic induction method, the electric power acquirer 4 may include a power receiving coil and generate a current in the power receiving coil by a magnetic force generated by a power feeding coil buried under a road surface of a road, i.e., underground. With such a power receiving method, it is possible to carry out non-contact power reception from outside the vehicle.

It is to be noted that the power receiving method is not limited to those of the non-contact type, but methods of a contact type may be adopted. Non-limiting examples may include a method in which the electric power acquirer 4 includes a power receiving electrode, and performs electric power reception by bringing the power receiving electrode into contact with a power feeding electrode. The power feeding electrode may be provided outside the vehicle.

Further, the electric power acquirer 4 is not limited to a configuration in which the power reception is carried out from outside the vehicle but may be of a configuration in which electric power is acquired by a power generator such as a solar generator, without limitation.

In order to improve a fuel consumption rate and a power consumption rate of the vehicle, in one example, the electric power acquirer 4 is configured not to generate power with an input of motive power obtained inside the vehicle. Non-limiting examples of the motive power obtained inside the vehicle may include motive power of the engine 50 and the motor generator 2.

The first switch SW1 may include a relay inserted between the electric power acquirer 4 and the high-voltage battery 3. The first switch SW1 may be able to establish and interrupt electrical coupling between the electric power acquirer 4 and the high-voltage battery 3. That is, owing to the first switch SW1, it is possible to make the ON/OFF switching of the charging of the high-voltage battery 3 with electric power obtained by the electric power acquirer 4.

The auxiliary subsystem 5 includes the auxiliary battery 6 and auxiliary machinery, or auxiliaries, to be fed with electric power by the auxiliary battery 6. The output voltage of the auxiliary battery 6 is lower than the output voltage of the high-voltage battery 3. A rated output voltage of the auxiliary battery 6 may be, for example, about 12 V.

The auxiliary machinery may include various on-board electric devices. Specific but non-limiting examples of the auxiliary machinery may include an integrated starter generator (ISG) 7 as illustrated in the drawing. Not only the ISG 7 may convert engine torque into electric power to carry out power generation, the ISG 7 may also be able to convert electric power into engine torque to cause an engine start. This makes it possible to allow the ISG 7 to serve both as a starter motor for the engine start and as an alternator for the power generation using the engine torque.

Though illustration is omitted, the auxiliary machinery may include not only the ISG 7 but also other electric devices each of which is coupled to the auxiliary battery 6. Specific but non-limiting examples of the electric devices may include a car navigation device and an audio device.

The main DC/DC converter 8 may be supplied with a voltage, e.g., a DC (direct current) voltage, obtained at a coupling point of the motor generator 2 and the relay switch SWh. The main DC/DC converter 8 may step down the voltage supplied, to output the stepped-down voltage to the auxiliary subsystem 5. The main DC/DC converter 8 may be supplied with the output voltage of the high-voltage battery 3, with the relay switch SWh turned ON. In this case, the main DC/DC converter 8 steps down the output voltage of the high-voltage battery 3, and supply the stepped-down output voltage of the high-voltage battery 3 to the auxiliary subsystem 5.

The sub DC/DC converter 9 may be supplied with the output voltage, e.g., a DC voltage, of the electric power acquirer 4. The sub DC/DC converter 9 may step down the voltage supplied, to output the stepped-down voltage to the auxiliary subsystem 5.

The controller 10 may include a microcomputer including, for example but not limited to, a central processing unit (CPU), a read only memory (ROM), and a random access memory (RAM). The controller 10 may perform an ON/OFF switching control of the first switch SW1, and an operation control of the main DC/DC converter 8 and the sub DC/DC converter 9. Thus, the controller 10 controls power feeding from the high-voltage battery 3 and from the electric power acquirer 4.

In this example, the controller 10 may include an electronic control unit (ECU) that performs a switching control of a power transmission path in the vehicle as the HEV. The controller 10 may give the motor generator 2 an instruction to switch between the powering operation and the regenerative operation.

Moreover, the controller 10 may perform an ON/OFF switching control of the relay switch SWh. Thus, the controller 10 may perform ON/OFF switching of the power feeding from the high-voltage battery 3 to the motor generator 2 and to the main DC/DC converter 8, and perform ON/OFF switching of the charging of the high-voltage battery 3 by the motor generator 2 engaged in the regenerative operation.

Furthermore, to the controller 10, coupled may be a detector 11.

The detector 11 may detect an output-voltage value and an output-current value of the auxiliary battery 6. That is, the detector 11 may detect a load current value of the auxiliary battery 6.

On the basis of the output-voltage value of the auxiliary battery 6, it is possible to estimate a state of charge of the auxiliary battery 6. Moreover, on the basis of the output-current value of the auxiliary battery 6, it is possible to estimate magnitude of a load on the auxiliary battery 6, i.e., magnitude of power consumption of the auxiliary machinery.

The controller 10 in this embodiment may control the power feeding from the high-voltage battery 3 and from the electric power acquirer 4 on the basis of a detected value by the detector 11 and the SOC of the high-voltage battery 3.

The on-board electrical system 1 of this embodiment is configured to be able to perform the power feeding from the high-voltage battery 3 to the auxiliary subsystem 5 through the main DC/DC converter 8. In such a configuration, electric power is taken out from the high-voltage battery 3, not only by the motor generator 2 but also by the auxiliary subsystem 5. This contributes to higher frequency of the take-out of electrical power from the high-voltage battery 3, causing possibility of deterioration in the high-voltage battery 3. In addition, because electric power is also taken out by the auxiliary subsystem 5, there is possibility that shortage of an amount of charged electric power in the high-voltage battery 3 causes shortage of driving electric power of the motor generator 2.

The forgoing concerns such as the deterioration in the high-voltage battery 3 and the shortage of the driving electric power of the motor generator 2 are more likely to become realistic because of frequent cranking of the engine 50 caused by the ISG 7.

Thus, in this embodiment, the controller 10 is configured to determine whether or not the magnitude of the load on the auxiliary battery 6 is equal to or greater than predetermined magnitude. In a case where the magnitude of the load is equal to or greater than the predetermined magnitude, the controller 10 is configured to allow electric power from the electric power acquirer 4 to be fed to the auxiliary subsystem 5 through the sub DC/DC converter 9.

This makes it possible to perform the power feeding to the auxiliary subsystem 5 not only from the high-voltage battery 3 but also from the electric power acquirer 4 in a case with the auxiliary machinery spending great power consumption.

Hence, it is possible to reduce frequency of the take-out of a large amount of electric power from the high-voltage battery 3 to the auxiliary subsystem 5, leading to suppression of the deterioration in the high-voltage battery 3 and prevention of the shortage of the driving electric power of the motor generator 2.

Figure 2:
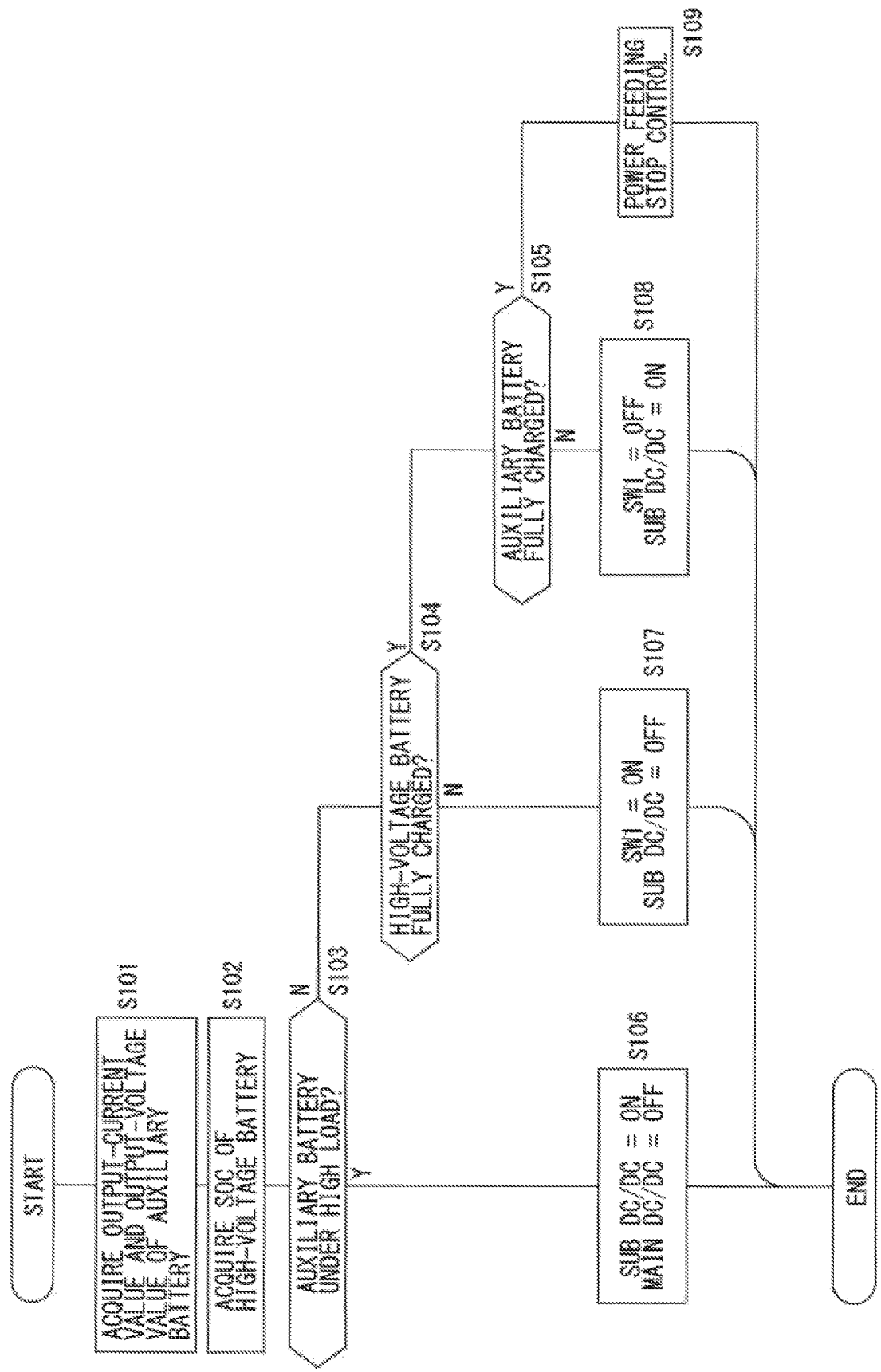
FIG. 2 is a flowchart illustrating power feeding control processing according to the first embodiment.

FIG. 2 is a flowchart illustrating more specific details of power feeding control processing to be performed by the controller 10.

It is to be noted that the processing illustrated in FIG. 2 may be repeatedly executed on predetermined cycles.

Moreover, it is assumed in this example that the electric power acquirer 4 is available for electric power acquisition. It is to be noted that the processing illustrated in FIG. 2 may be started on the condition that a determination is made as to whether or not the electric power acquirer 4 is available for the electric power acquisition, and that a positive result is obtained.

What is described above applies similarly to processing of FIGS. 3, 5, 6, and 8 described later.

First, in step S101, the controller 10 may execute processing of acquiring the output-current value and the output-voltage value of the auxiliary battery 6. That is, the controller 10 may acquire the output-current value and the output-voltage value detected by the detector 11.

Thereafter, in step S102, the controller 10 may acquire the SOC of the high-voltage battery 3.

In step S103 following step S102, the controller 10 may determine whether or not the auxiliary battery 6 is under a high load. In one specific but non-limiting example, the controller 10 may determine whether or not the output-current value of the auxiliary battery 6 acquired in step S101 is equal to or greater than a predetermined threshold value.

In a case where the controller 10 determines that the output-current value of the auxiliary battery 6 is equal to or greater than the predetermined threshold value, that is, the auxiliary battery 6 is under the high load (step S103: Y), the controller 10 may proceed to step S106. In step S106, the controller 10 may perform a control of turning ON the sub DC/DC converter 9 and turning OFF the main DC/DC converter 8. Turning ON the sub DC/DC converter 9 causes electric power from the electric power acquirer 4 to be fed to the auxiliary subsystem 5 through the sub DC/DC converter 9, and turning OFF the main DC/DC converter 8 into an operation stopped state causes a stop of the power feeding from the high-voltage battery 3 to the auxiliary subsystem 5 through the main DC/DC converter 8.

Stopping the power feeding from the high-voltage battery 3 to the auxiliary subsystem 5 as mentioned above, in accordance with the case with the auxiliary battery 6 under the high load, makes it possible to reduce an amount of electric power to be taken out from the high-voltage battery 3 to the auxiliary subsystem 5. Hence, it is possible to enhance an effect of suppressing the deterioration in the high-voltage battery 3 and an effect of preventing the occurrence of the shortage of the driving electric power of the motor generator 2.

It is to be noted that in step S106, the main DC/DC converter 8 may be turned OFF, in stopping the power feeding from the high-voltage battery 3 to the auxiliary subsystem 5. However, this is non-limiting, and there may be other controls of stopping the power feeding from the high-voltage battery 3 to the auxiliary subsystem 5. For example, in a configuration in which an output of the main DC/DC converter 8 is branched and supplied not only to the auxiliary subsystem 5 but also to, for example, on-board electronic devices undepicted in FIG. 1, performed may be a control of stopping solely an output of the main DC/DC converter 8 toward the auxiliary subsystem 5. In this way, it is possible to stop the power feeding to the auxiliary subsystem 5.

In step S103, in a case where the controller 10 determines that the auxiliary battery 6 is not under the high load (step S103: N), the controller 10 may proceed to step S104. In step S104, the controller 10 may determine whether or not the high-voltage battery 3 is fully charged. The determination processing of step S104 may be performed by determining whether or not a value of the SOC acquired in step S102 is equal to or greater than a full charge level, e.g., 100%.

In step S104, in a case where the controller 10 determines that the high-voltage battery 3 is short of full charge (step S104: N), the controller 10 may proceed to step S107. In step S107, the controller 10 may carry out a control of turning ON the first switch SW1 and turning OFF the sub DC/DC converter 9.

Turning ON the first switch SW1 causes the high-voltage battery 3 to be charged with electric power from the electric power acquirer 4. At this occasion, turning OFF the sub DC/DC converter 9 causes a stop of the power feeding from the electric power acquirer 4 to the auxiliary subsystem 5. This leads to efficient charging of the high-voltage battery 3 by the electric power acquirer 4.

Meanwhile, in step S104, in a case where the controller 10 determines that the high-voltage battery 3 is fully charged (step S104: Y), the controller 10 may proceed to step S105. In step S105, the controller 10 may determine whether or not the auxiliary battery 6 is fully charged. In this example, the determination as to whether or not the auxiliary battery 6 is fully charged may be made as a determination as to whether or not the output-voltage value of the auxiliary battery 6 acquired in step S101 is equal to or greater than a predetermined threshold value, for example, 14 V.

In step S105, in a case where the controller 10 determines that the auxiliary battery 6 is short of full charge (step S105: N), the controller 10 may proceed to step S108. In step S108, the controller 10 may perform a control of turning OFF the first switch SW1 and turning ON the sub DC/DC converter 9. Thus, in a case where the auxiliary battery 6 is not under the high load, when the high-voltage battery 3 is fully charged and the auxiliary battery 6 is short of full charge, the power feeding is carried out from the electric power acquirer 4 to the auxiliary subsystem 5 through the sub DC/DC converter 9. At this occasion, because the first switch SW1 is turned OFF, the high-voltage battery 3 is free from the charging with electric power from the electric power acquirer 4. In other words, excessive charging of the high-voltage battery 3 is prevented.

In step S105, in a case where the controller 10 determines that the auxiliary battery 6 is fully charged (step S105: Y), the controller 10 may proceed to step S109. In step S109, the controller 10 may perform a power feeding stop control. The power feeding stop control may include stopping the power feeding from the electric power acquirer 4 to the high-voltage battery 3 and to the auxiliary subsystem 5. As the power feeding stop control, the controller 10 according to this example may perform a control of turning OFF the electric power acquirer 4, i.e., a control of bringing the electric power acquirer 4 to the operation stopped state.

Performing the power feeding stop control in step S109 makes it possible to keep both the high-voltage battery 3 and the auxiliary battery 6 from being charged with electric power from the electric power acquirer 4, in the case where the auxiliary battery 6 is not under the high load and both the high-voltage battery 3 and the auxiliary battery 6 are fully charged. Hence, it is possible to prevent excessive charging of both the high-voltage battery 3 and the auxiliary battery 6.

It is to be noted that the power feeding stop control in step S109 is not limited to the control of turning OFF the electric power acquirer 4. For example, in a configuration in which electric power acquired by the electric power acquirer 4 is also supplied to, for example, the on-board electronic devices undepicted in FIG. 1, the power feeding stop control may include a control of turning OFF the first switch SW1 and the sub DC/DC converter 9, without bringing the electric power acquirer 4 to the operation stopped state.

The controller 10 may terminate the processing illustrated in FIG. 2 in accordance with the execution of the processing of any one of steps S106 to S109.

Figure 3:
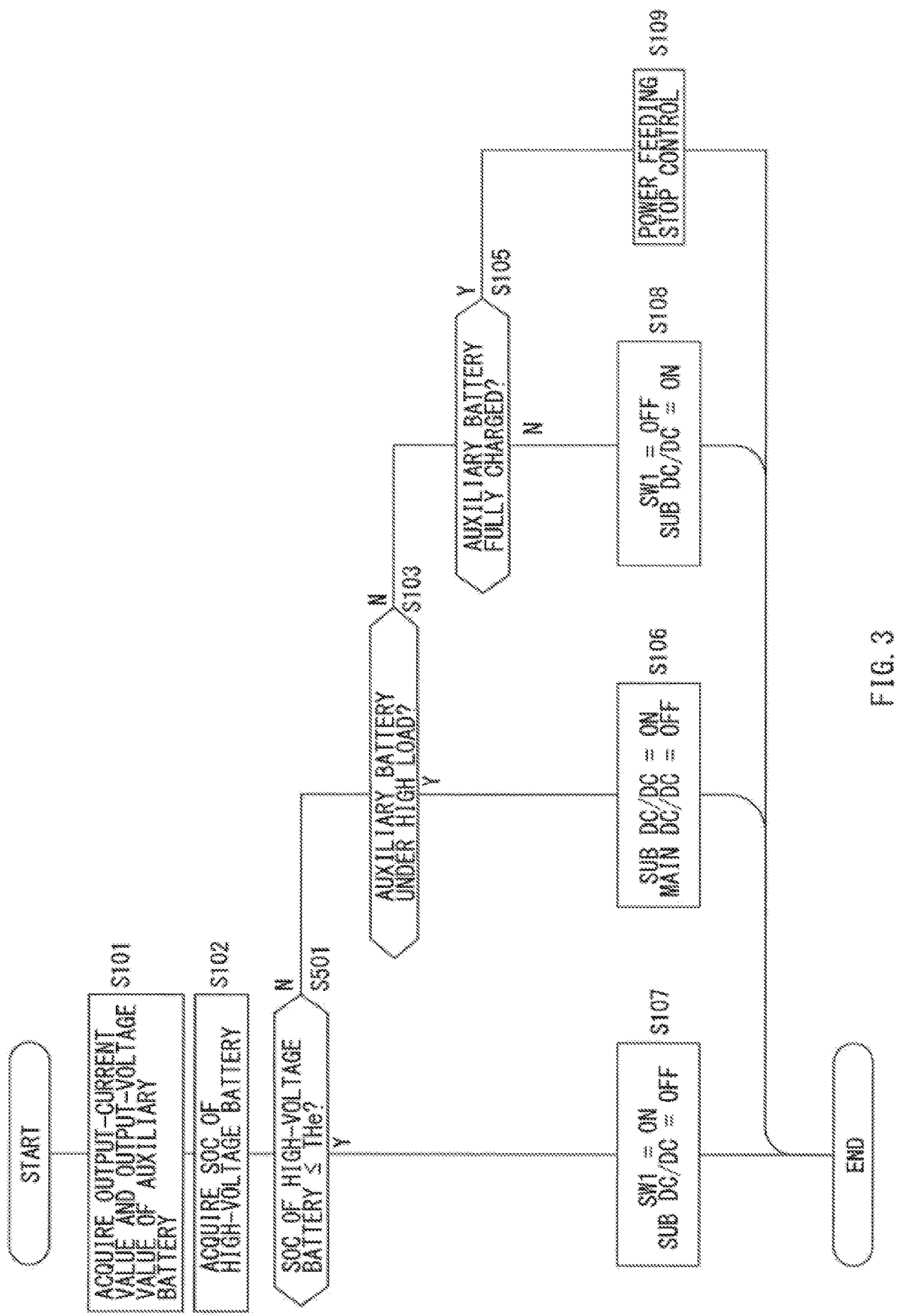
FIG. 3 is a flowchart illustrating power feeding control processing according a modification example of the first embodiment.

FIG. 3 is a flowchart illustrating power feeding control processing according to a modification example of the first embodiment.

In the processing illustrated in FIG. 2, in the case with the determination that the auxiliary battery 6 is under the high load (step S103:Y), the controller 10 may execute the processing of step S106, i.e., the control of causing the power feeding from the electric power acquirer 4 to the auxiliary subsystem 5, without determining whether or not the high-voltage battery 3 is fully charged. In other words, in the case where the magnitude of the load on the auxiliary battery 6 is equal to or greater than the predetermined magnitude, the processing illustrated in FIG. 2 may include causing the power feeding from the electric power acquirer 4 to the auxiliary subsystem 5, regardless of whether or not the high-voltage battery 3 is fully charged. Hence, it is possible to give priority to the power feeding from the electric power acquirer 4 to the auxiliary subsystem 5 in accordance with the case with the auxiliary battery 6 under the high load, rather than giving priority to the charging of the high-voltage battery 3 by the electric power acquirer 4.

The modification example illustrated in FIG. 3 may include giving priority to the charging of the high-voltage battery 3 by the electric power acquirer 4.

In this specific but non-limiting example, the controller 10 may execute the acquisition processing of steps S101 and S102, and thereupon, in step S501, the controller 10 may determine whether or not the SOC of the high-voltage battery 3 is equal to or smaller than a threshold THe. As the threshold THe, there may be set a value smaller than the SOC at the full charge level, for example, 100% in this example. In one possible example, the threshold THe may be set at a value of 50% or less.

The processing of step S501 is intended for a determination as to whether or not remaining capacity of the high-voltage battery 3 has lowered to a level where the charging is necessary.

In step S501, in a case where the controller 10 determines that the SOC of the high-voltage battery 3 is equal to or smaller than the threshold THe (step S501: Y), the controller 10 may proceed to step S107. In step S107, the controller 10 may perform the control of turning ON the first switch SW1 and turning OFF the sub DC/DC converter 9.

This allows the electric power acquirer 4 to charge the high-voltage battery 3, regardless of the magnitude of the load on the auxiliary battery 6, in the case where the remaining capacity of the high-voltage battery 3 has lowered to predetermined remaining capacity or less.

Meanwhile, in step S501, in a case where the controller 10 determines that the SOC of the high-voltage battery 3 is greater than the threshold THe (step S501: N), the controller 10 may proceed to step S103. In step S103, the controller 10 may determine whether or not the auxiliary battery 6 is under the high load. In the case where the auxiliary battery 6 is under the high load (step S103: Y), the controller 10 may also execute the processing of step S106, causing the power feeding to the auxiliary subsystem 5, not from the high-voltage battery 3 but from the electric power acquirer 4.

In step S103, in the case where the controller 10 determines that the auxiliary battery 6 is not under the high load (step S103: N), the controller 10 may proceed to step S105. In step S105, the controller 10 may determine whether or not the auxiliary battery 6 is fully charged. In the case where the auxiliary battery 6 is short of full charge (step S105: N), the controller 10 may execute the processing of step S108. That is, the controller 10 may allow the electric power acquirer 4 to charge the auxiliary battery 6 while hindering the electric power acquirer 4 from charging the high-voltage battery 3.

Meanwhile, in the case where the auxiliary battery 6 is fully charged (step S105: Y), the controller 10 may execute the power feeding stop control of step S109. This causes the stop of the power feeding from the electric power acquirer 4 to the high-voltage battery 3 and to the auxiliary subsystem 5, in the case where the remaining capacity of the high-voltage battery 3 has not lowered to the predetermined remaining capacity or less, the auxiliary battery 6 is not under the high load, and the auxiliary battery 6 is fully charged.

It is to be noted that as for the determination processing of step S501, a determination may be made as to whether or not the high-voltage battery 3 is fully charged, with the threshold THe set to the value of the SOC at the full charge level.

As described above, the on-board electrical system 1 according to the first embodiment includes the motor generator 2, the high-voltage battery 3, the electric power acquirer 4, the auxiliary subsystem 5 including the auxiliary battery 6 and the ISG 7, the main DC/DC converter 8, the sub DC/DC converter 9, and the controller 10.

In one embodiment of the technology, the on-board electrical system 1 may serve as an "on-board electrical system". The motor generator 2 may serve as a "motor generator" configured to perform powering operation to drive one or more wheels of a vehicle, and configured to perform regenerative operation to generate electric power. The high-voltage battery 3 may serve as a "high-voltage battery" subject to charging with electric power generated by the motor generator, and configured to feed electric power to the motor generator engaged in the powering operation. The electric power acquirer 4 may serve as an "electric power acquirer" able to acquire electric power during travel of the vehicle, and able to feed acquired electric power to the high-voltage battery. The auxiliary subsystem 5 may serve as an "auxiliary subsystem" including an "auxiliary battery" and "auxiliary machinery" to be fed with electric power by the auxiliary battery, in which an output voltage of the auxiliary battery is lower than an output voltage of the high-voltage battery. The main DC/DC converter 8 may serve as a "first step-down unit" configured to step down the output voltage of the high-voltage battery, and able to supply the stepped-down output voltage of the high-voltage battery to the auxiliary subsystem. The sub DC/DC converter 9 may serve as a "second step-down unit" configured to step down the output-voltage of the electric power acquirer, and able to supply the stepped-down output voltage of the electric power acquirer to the auxiliary subsystem. The controller 10 may serve as a "controller" configured to control power feeding from the high-voltage battery and from the electric power acquirer.

Further, the controller is configured to determine whether or not magnitude of a load on the auxiliary battery is equal to or greater than predetermined magnitude. On the condition that the magnitude of the load is equal to or greater than the predetermined magnitude, the controller is configured to allow electric power from the electric power acquirer to be fed to the auxiliary subsystem through the second step-down unit.

This makes it possible to perform the power feeding to the auxiliary subsystem not only from the high-voltage battery but also from the electric power acquirer, in the case with the auxiliary machinery spending great power consumption.

Hence, it is possible to reduce frequency of take-out of a large amount of electric power from the high-voltage battery to the auxiliary subsystem, leading to suppression of deterioration in the high-voltage battery and prevention of occurrence of shortage of driving electric power of the motor generator.

Moreover, in this embodiment, electric power from the electric power acquirer is able to be fed to the auxiliary subsystem through the second step-down unit, e.g. the sub DC/DC converter 9. Without the second step-down unit, electric power from the electric power acquirer would be fed to the auxiliary subsystem as follows. For example, electric power from the electric power acquirer would have been fed to the auxiliary subsystem through the high-voltage battery and the first step-down unit, e.g., the main DC/DC converter 8. Meanwhile, in this embodiment, electric power from the electric power acquirer is able to be fed to the auxiliary subsystem solely through the second step-down unit. Hence, it is possible to reduce a loss of the power feeding from the electric power acquirer to the auxiliary subsystem.

Furthermore, in the on-board electrical system according to the first embodiment, in the case where the magnitude of the load is equal to or greater than the predetermined magnitude, the controller may allow electric power from the electric power acquirer to be fed to the auxiliary subsystem through the second step-down unit, while stopping the power feeding from the high-voltage battery to the auxiliary subsystem through the first step-down unit.

This causes a stop of the power feeding from the high-voltage battery to the auxiliary subsystem in the case with the auxiliary machinery spending great power consumption.

Hence, it is possible to reduce an amount of electric power to be taken out from the high-voltage battery to the auxiliary subsystem. This leads to enhancement in an effect of the suppression of the deterioration in the high-voltage battery and an effect of the prevention of the occurrence of the shortage of the driving electric power of the motor generator.

In addition, in the on-board electrical system according to the first embodiment, in the case where the magnitude of the load is equal to or greater than the predetermined magnitude, the controller may allow electric power from the electric power acquirer to be fed to the auxiliary subsystem through the second step-down unit, regardless of whether or not the high-voltage battery is fully charged.

This causes the power feeding from the electric power acquirer to the auxiliary subsystem, in the case where the auxiliary battery is under the high load, even when the high-voltage battery is short of full charge. In other words, it is possible to provide further reduction in the frequency of the take-out of the large amount of electric power from the high-voltage battery to the auxiliary subsystem.

Hence, it is possible to enhance the effect of the suppression of the deterioration in the high-voltage battery and the effect of the prevention of the occurrence of the shortage of the driving electric power of the motor generator.

Moreover, in the on-board electrical system according to the first embodiment, the controller further determines whether or not the high-voltage battery is fully charged. In the case where the high-voltage battery is short of full charge, and the magnitude of the load is smaller than the predetermined magnitude, the controller may allow the electric power acquirer to charge the high-voltage battery.

This makes it possible to cause the power feeding from the electric power acquirer to the auxiliary subsystem in accordance with the case with the auxiliary subsystem under the high load, and to cause the charging of the high-voltage battery with electric power from the electric power acquirer in the case where the high-voltage battery is short of full charge.

Hence, it is possible to reduce the frequency of the take-out of the large amount of electric power from the high-voltage battery to the auxiliary subsystem, and to switch appropriately a destination of the power feeding from the electric power acquirer in accordance with the state of charge of the high-voltage battery.

Moreover, in the on-board electrical system according to the first embodiment, the controller may further determine whether or not the auxiliary battery is fully charged. In the case where the high-voltage battery is fully charged and the auxiliary battery is short of full charge, when the magnitude of the load is smaller than the predetermined magnitude, the controller may allow electric power from the electric power acquirer to be fed to the auxiliary subsystem through the second step-down unit.

This makes it possible to cause the power feeding from the electric power acquirer to the auxiliary subsystem in accordance with the case with the auxiliary subsystem under the high load, and to cause the charging of the auxiliary battery with electric power from the electric power acquirer in the case where the charging of the high-voltage battery is unnecessary and the charging of the auxiliary battery is necessary.

Hence, it is possible to reduce the frequency of the take-out of the large amount of electric power from the high-voltage battery to the auxiliary subsystem, and to switch appropriately the destination of the power feeding from the electric power acquirer in accordance with the states of charge of the high-voltage battery and the auxiliary battery.

Furthermore, in the on-board electrical system according to the first embodiment, the controller may stop the power feeding from the electric power acquirer to the high-voltage battery and to the auxiliary subsystem, in the case where both the high-voltage battery and the auxiliary battery are fully charged and the magnitude of the load is smaller than the predetermined magnitude.

Hence, it is possible to prevent the excessive charging of the high-voltage battery and the auxiliary battery.

In addition, in the on-board electrical system according to the first embodiment, the electric power acquirer may perform electric power reception from outside the vehicle, using electromagnetic induction.

Using electromagnetic induction makes it possible to perform non-contact, large-capacity power reception from outside the vehicle.

Hence, it is possible to perform highly efficient charging of the high-voltage battery using an external power supply, while eliminating various restrictions in a case of contact type power reception. Moreover, enhanced charging efficiency leads to greater capacity of the high-voltage battery.

Furthermore, as described in the modification example with reference to FIG. 3, the on-board electrical system according to the first embodiment may include the motor generator, the high-voltage battery, the electric power acquirer, the auxiliary subsystem, the first step-down unit, the second step-down unit, and the controller. The controller determines whether or not a state of charge of the high-voltage battery is equal to or smaller than a threshold (e.g., step S501). In the case where the state of charge is equal to or smaller than the threshold, the controller stops the power feeding from the electric power acquirer to the auxiliary subsystem through the second step-down unit, and allows the electric power acquirer to charge the high-voltage battery (e.g., step S107).

According to the configuration described above, the second step-down unit is included that is able to step down the output voltage of the electric power acquirer and able to supply the stepped-down output voltage of the electric power acquirer to the auxiliary subsystem. Hence, it is possible to cause the power feeding to the auxiliary subsystem not only from the high-voltage battery but also from the electric power acquirer. The forgoing control by the controller makes it possible to allow the electrical power acquirer to charge the high-voltage battery, regardless of the magnitude of the load on the auxiliary battery, in the case where remaining capacity charged in the high-voltage battery has lowered to predetermined remaining capacity or less.

Hence, it is possible to prevent insufficient charging of the high-voltage battery, while suppressing the deterioration in the high-voltage battery and preventing the occurrence of the shortage of the driving electric power of the motor generator.

2. Second Embodiment

Described next is an on-board electrical system 1A according to a second embodiment of the technology.

Figure 4:
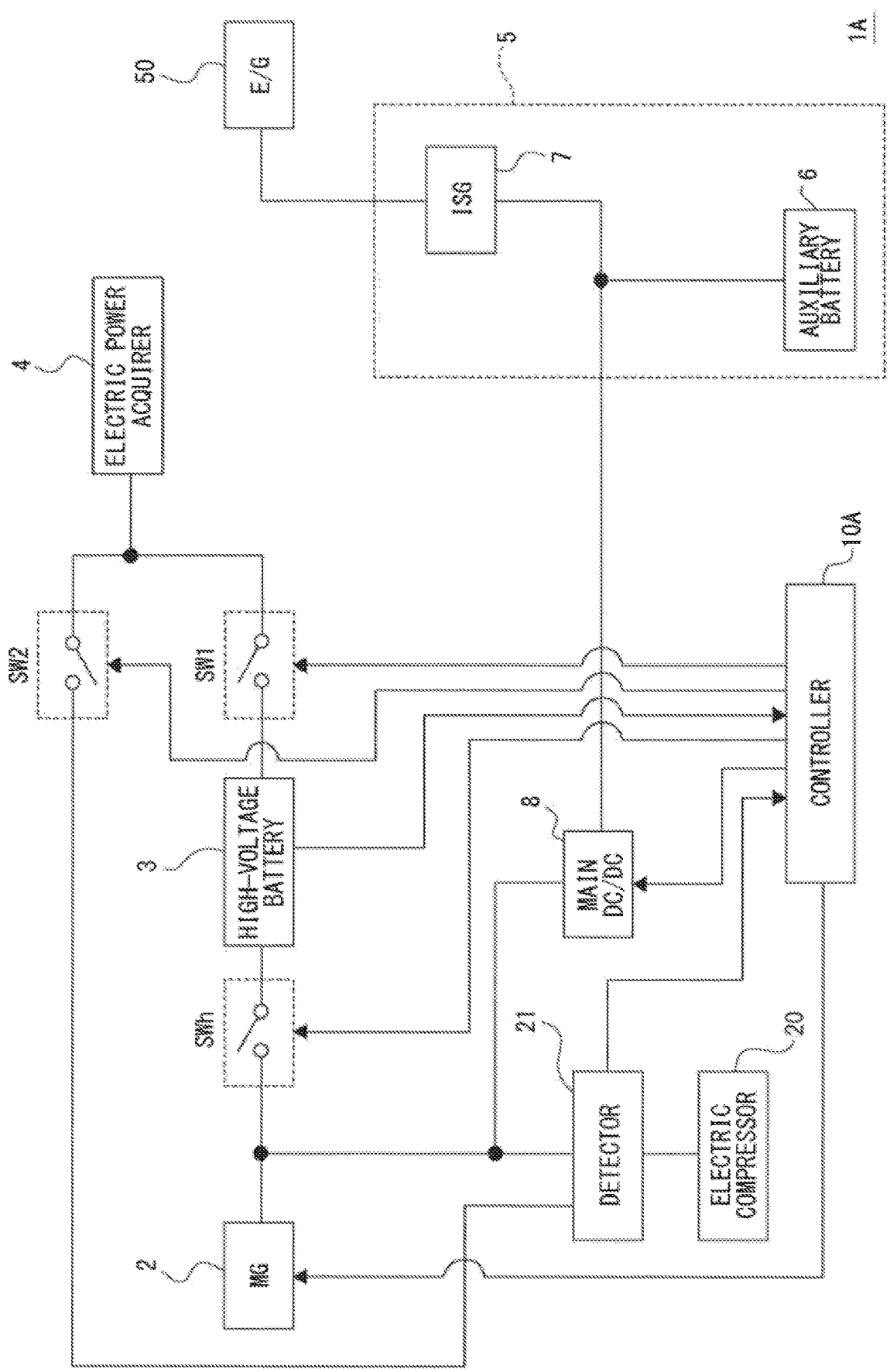
FIG. 4 is a circuit block diagram illustrating a configuration example of an on-board electrical system according to a second embodiment of the technology.

FIG. 4 is a circuit block diagram illustrating a configuration example of the on-board electrical system 1A.

It is to be noted that in the following description, the same reference numerals are assigned to the same portions as those already described, and description thereof is omitted.

The on-board electrical system 1A differs from the on-board electrical system 1 of the first embodiment in that an electric compressor 20, a second switch SW2, and a detector 21 are added, that the sub DC/DC converter 9 and the detector 11 are omitted, and that a controller 10A is provided instead of the controller 10.

The electric compressor 20 may include an electric compressor for a vehicle room temperature control device. The vehicle room temperature control device may make a temperature adjustment of a vehicle cabin. The electric compressor 20 may operate, with a voltage obtained at the coupling point of the relay switch SWh and the motor generator 2 being inputted as a power supply voltage. That is, the electric compressor 20 may be able to operate with the high-voltage battery 3 as a power supply.

Moreover, the electric compressor 20 may be able to be fed with electric power from the electric power acquirer 4 through the second switch SW2. It is to be noted that the second switch SW2 may include a relay as an electromagnetic relay.

The detector 21 may detect a current value of a current flowing through a power supply line to the electric compressor 20, i.e., current consumption of the electric compressor 20. In this example, the power supply line to the electric compressor 20 may include, for example, a power supply line from the high-voltage battery 3 through the relay switch SWh, and a power supply line from the electric power acquirer 4 through the second switch SW2.

The controller 10A may include a microcomputer, as with the controller 10 illustrated in FIG. 1. The controller 10A may be able to perform an ON/OFF switching control of the second switch SW2 as well as the ON/OFF switching control of the relay switch SWh and the first switch SW1 and the operation control of the main DC/DC converter 8. Moreover, the controller 10A, as with the controller 10, may include an ECU that performs the switching control of the power transmission path in the vehicle. The controller 10A may give the motor generator 2 the instruction to switch between the powering operation and the regenerative operation.

The detector 21 may be coupled to the controller 10A. This makes it possible for the controller 10A to acquire a current consumption value of the electric compressor 20 detected by the detector 21. On the basis of the current consumption value detected by the detector 21, it is possible to estimate power consumption of the electric compressor 20.

The controller 10A according to the second embodiment may control the power feeding at least from the electric power acquirer 4, on the basis of a detected value of the power consumption detected by the detector 21 and on the basis of the SOC of the high-voltage battery 3.

In a case where the high-voltage battery 3 is used as a power supply of an electric motor that spends great power consumption, e.g., the electric compressor 20, there is higher frequency of the take-out of the large amount of electric power from the high-voltage battery 3, causing possibility of the deterioration in the high-voltage battery 3 and the shortage of the driving electric power of the motor generator 2.

In the second embodiment, therefore, the controller 10A determines whether or not magnitude of the power consumption of the electric compressor 20 is equal to or greater than predetermined magnitude. In a case where the magnitude of the power consumption is equal to or greater than the predetermined magnitude, the controller 10A allows electric power from the electric power acquirer 4 to be fed to the electric compressor 20.

Thus, in the case with the electric compressor 20 spending great power consumption, the power feeding to the electric compressor 20 is carried out not only from the high-voltage battery 3 but also from the electric power acquirer 4. This leads to the reduction in the frequency of the take-out of the large amount of electric power from the high-voltage battery 3 to the electric compressor 20.

Hence, it is possible to suppress the deterioration in the high-voltage battery 3 and to prevent the occurrence of the shortage of the driving electric power of the motor generator 2.

Figure 5:
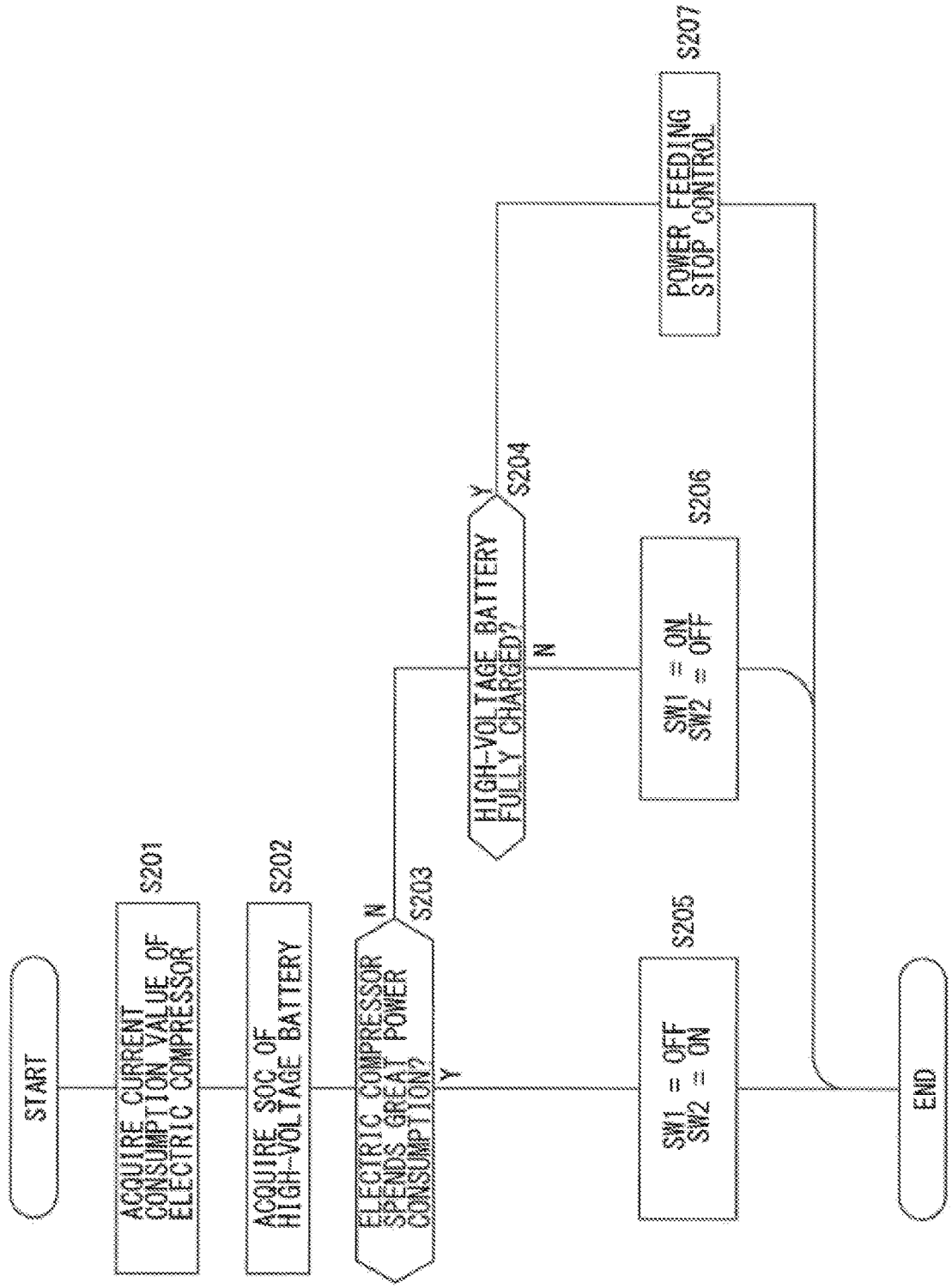
FIG. 5 is a flowchart illustrating power feeding control processing according to the second embodiment.

FIG. 5 is a flowchart illustrating a more specific example of power feeding control processing to be performed by the controller 10A.

First, in step S201, the controller 10A may acquire the current consumption value of the electric compressor 20. That is, the controller 10A may acquire the current consumption value of the electric compressor 20 detected by the detector 21.

Thereafter, in step S202, the controller 10A may acquire the SOC of the high-voltage battery 3.

In step S203 following step S202, the controller 10A may determine whether or not the electric compressor 20 spends great power consumption. In one specific but non-limiting example, the controller 10A may determine whether or not the current consumption value acquired in step S201 is equal to or greater than a predetermined threshold value.

In a case where the controller 10A determines that the current consumption value is equal to or greater than the predetermined threshold value, and the electric compressor 20 spends great power consumption (step S203: Y), the controller 10A may proceed to step S205. In step S205, the controller 10A may perform a control of turning OFF the first switch SW1 and turning ON the second switch SW2. That is, turning ON the second switch SW2 causes the power feeding from the electric power acquirer 4 to the electric compressor 20.

At this occasion, turning OFF the first switch SW1 hinders the charging of the high-voltage battery 3 by the electric power acquirer 4. This makes it possible to reduce a loss in the power feeding from the electric power acquirer 4 to the electric compressor 20.

As described, in the case with the electric compressor 20 spending great power consumption, the power feeding from the electric power acquirer 4 to the electric compressor 20 is carried out.

Moreover, in step S203, in a case where the controller 10A determines that the current consumption value is smaller than the predetermined threshold value, and the electric compressor 20 does not spend great power consumption (step S203: N), the controller 10A may proceed to step S204. In step S204, the controller 10A may determine whether or not the high-voltage battery 3 is fully charged. The determination as to whether or not the high-voltage battery 3 is fully charged may be made by determining whether or not the value of the SOC acquired in step S202 is equal to or greater than the full charge level, e.g., 100%.

In step S204, in a case where the controller 10A determines that the high-voltage battery 3 is short of full charge (step S204: N), the controller 10A may proceed to step S206. In step S206, the controller 10A may perform a control of turning ON the first switch SW1 and turning OFF the second switch SW2.

Turning ON the first switch SW1 causes the charging of the high-voltage battery 3 by the electric power acquirer 4. At this occasion, turning OFF the second switch SW2 leads to the efficient charging of the high-voltage battery 3 by the electric power acquirer 4.

As described, the controller 10A may determine whether or not the high-voltage battery 3 is fully charged. In the case where the high-voltage battery 3 is short of full charge, the controller 10A may allow the electric power acquirer 4 to charge the high-voltage battery 3.

Hence, it is possible to cause the power feeding from the electric power acquirer 4 to the electric compressor 20 in accordance with the case with the electric compressor 20 spending great power consumption. In the case where the high-voltage battery 3 is short of full charge, it is possible to allow the electric power acquirer 4 to charge the high-voltage battery 3.

Meanwhile, in step S204, in a case where the controller 10A determines that the high-voltage battery 3 is fully charged (step S204: Y), the controller 10A may perform, as the power feeding stop control in step S207, a control of stopping the power feeding from the electric power acquirer 4 to the high-voltage battery 3 and to the electric compressor 20. The power feeding stop control in step S207 may include, for example, bringing the electric power acquirer 4 to the operation stopped state. Alternatively, in a configuration in which electric power acquired by the electric power acquirer 4 is also supplied to the on-board electronic devices undepicted in FIG. 4, the power feeding stop control in step S207 may include, for example, turning OFF the first switch SW1 and the second switch SW2 without bringing the electric power acquirer 4 to the operation stopped state.

Performing the power feeding stop control in step S207, in the case with the high-voltage battery 3 fully charged, makes it possible to prevent the excessive charging of the high-voltage battery 3.

The controller 10A may terminate the processing illustrated in FIG. 5 in accordance with the execution of the processing of any one of steps S205 to S207.

It is to be noted that in the forgoing, described is an example where the power consumption of the electric compressor 20 may be estimated on the basis of the current consumption value of the electric compressor 20. The power consumption of the electric compressor 20, however, may be estimated on the basis of, for example but not limited to, a set air volume, a set temperature, or turning ON and OFF of a cooling function, e.g., turning ON and OFF of an A/C switch, or any combination thereof, in the vehicle room temperature control device.

Moreover, in the forgoing, the electric compressor 20 for the vehicle room temperature control device is given as an example of the electric motor with the high-voltage battery 3 as the power supply. However, the electric motor is not limited to the electric compressor 20. For example, other non-limiting examples of the electric motor may include an EOP (Electric Oil Pump) as, for example, a hydraulic fluid discharge source of a transmission.

In the processing illustrated in FIG. 5, in the case where the controller 10A determines that the electric compressor 20 is under the high load (S203:Y), the controller 10A may execute the processing of step S205, that is, the control of causing the power feeding from the electric power acquirer 4 to the electric compressor 20, without determining whether or not the high-voltage battery 3 is fully charged. In other words, in the case where the magnitude of the power consumption of the electric compressor 20 is equal to or greater than the predetermined magnitude, the power feeding from the electric power acquirer 4 to the electric compressor 20 is performed, regardless of whether or not the high-voltage battery 3 is fully charged. Hence, it is possible to give priority to the power feeding from the electric power acquirer 4 to the electric compressor 20 in accordance with the case with the electric compressor 20 spending great power consumption, rather than giving priority to the charging of the high-voltage battery 3 by the electric power acquirer 4.

Figure 6:
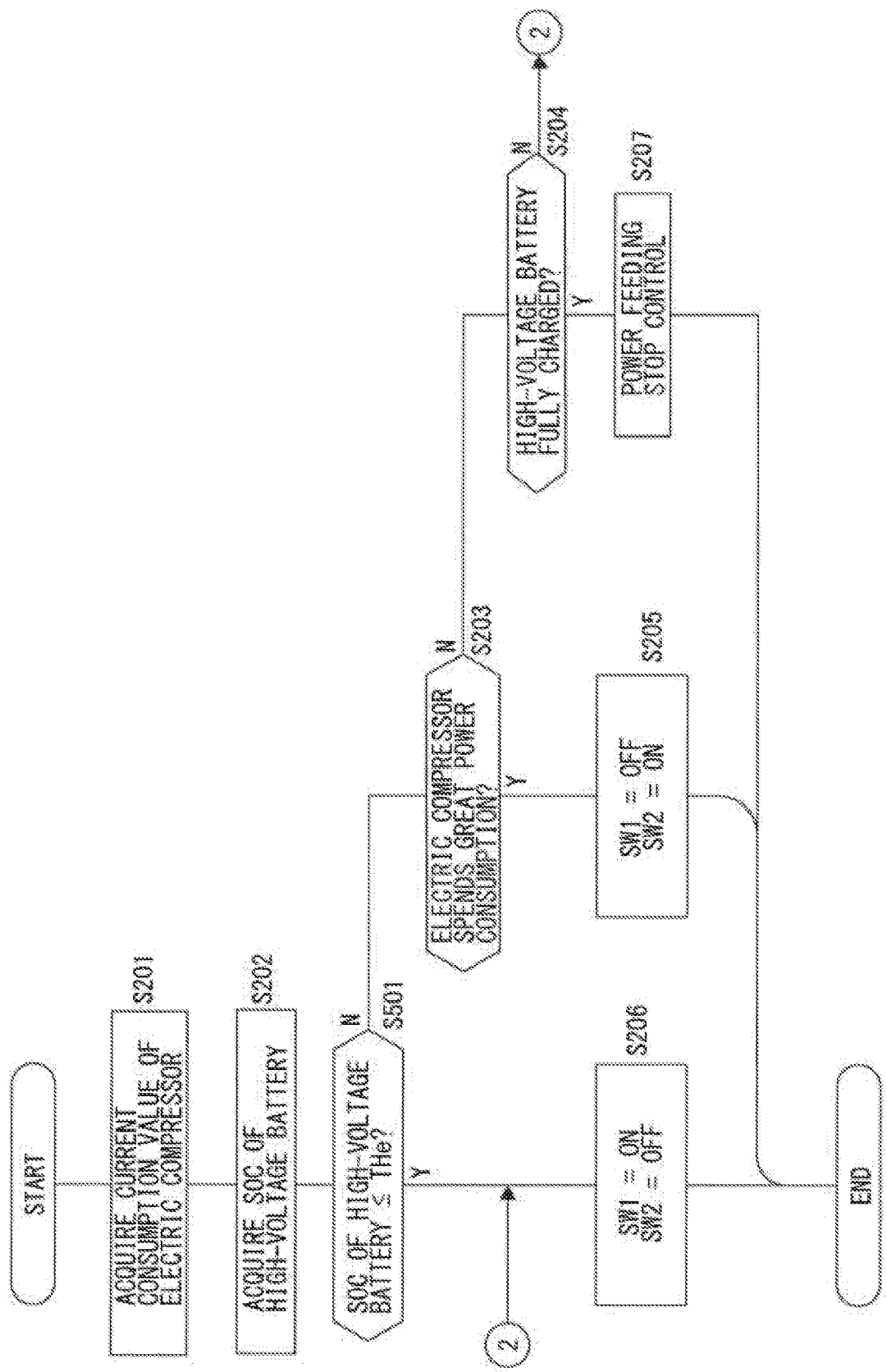
FIG. 6 is a flowchart illustrating power feeding control processing according to a first modification example of the second embodiment.

Alternatively, as in processing of a first modification example illustrated in FIG. 6, it is also possible to give priority to the charging of the high-voltage battery 3 by the electric power acquirer 4.

In this case, in FIG. 6, after the execution of the acquisition processing in steps S201 and S202, in step S501, the controller 10A may determine whether or not the SOC of the high-voltage battery 3 is equal to or smaller than the threshold THe.

In step S501, in the case where the controller 10A determines that the SOC of the high-voltage battery 3 is equal to or smaller than the threshold THe (step S501: Y), the controller 10A may proceed to step S206. In step S206, the controller 10A may perform a control to turning ON the first switch SW1 and turning OFF the second switch SW2.

Accordingly, in the case where the remaining capacity of the high-voltage battery 3 has lowered to the predetermined remaining capacity or less, it is possible to cause the charging of the high-voltage battery 3 by the electric power acquirer 4, regardless of the magnitude of the power consumption of the electric compressor 20.

Meanwhile, in step S501, in the case where the controller 10A determines that the SOC of the high-voltage battery 3 is greater than the threshold THe (step S501: N), the controller 10A may proceed to step S203. In step S203, the controller 10A may determine whether or not the electric compressor 20 spends great power consumption. In the case with the electric compressor 20 spending great power consumption (step S203: Y), the controller 10A may execute the processing of step S205 as well, causing the power feeding from the electric power acquirer 4 to the electric compressor 20.

In step S203, in the case where the controller 10A determines that the electric compressor 20 does not spend great power consumption (step S203: N), the controller 10A may proceed to step S204. In step S204, the controller 10A may determine whether or not the high-voltage battery 3 is fully charged. In the case where the high-voltage battery 3 is short of full charge (step S204: N), the controller 10A may execute the processing of step S206. This causes the charging of the high-voltage battery 3 by the electric power acquirer 4. At this occasion, turning OFF the second switch SW2 hinders the power feeding from the electric power acquirer 4 to the electric compressor 20. This leads to the efficient charging of the high-voltage battery 3.

Meanwhile, in the case with the high-voltage battery 3 fully charged (step S204: Y), the controller 10A may execute the power feeding stop control in step S207. Hence, it is possible to prevent the excessive charging of the high-voltage battery 3.

In another alternative example, as in the on-board electrical system 1 illustrated in FIG. 1, the on-board electrical system 1A according to the second embodiment may be configured to perform the power feeding from the electric power acquirer 4 to the auxiliary subsystem 5, without the route through the high-voltage battery 3.

Figure 7:
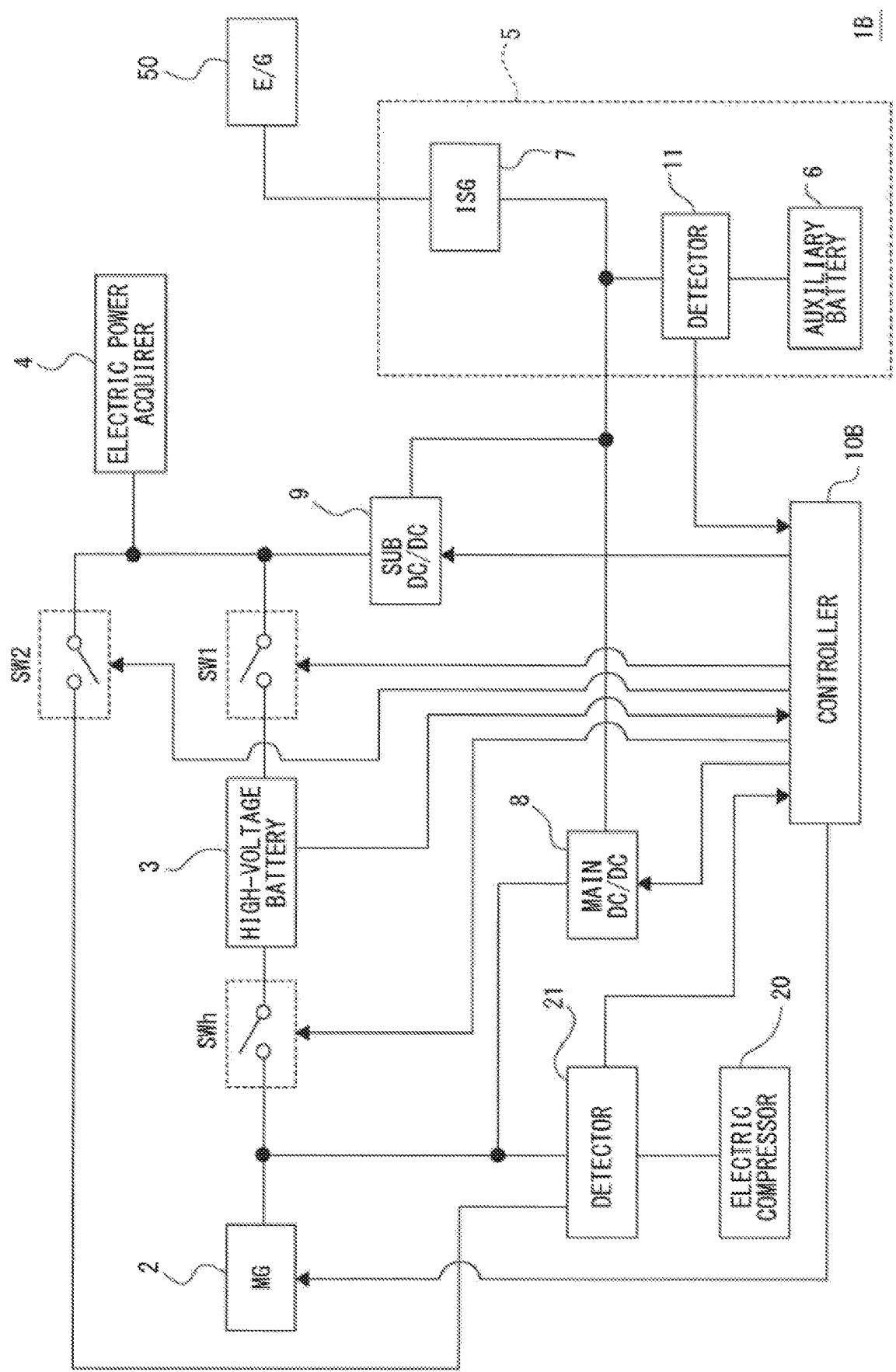
FIG. 7 is a circuit block diagram illustrating a configuration example of an on-board electrical system according to a second modification example of the second embodiment.

FIG. 7 is a circuit block diagram illustrating a configuration example of an on-board electrical system 1B as a second modification example with the sub DC/DC converter 9 added to the on-board electrical system 1A. The sub DC/DC converter 9 is provided for the power feeding from the electric power acquirer 4 to the auxiliary subsystem 5.

As illustrated in the figure, the on-board electrical system 1B may include a controller 10B instead of the controller 10A. In addition, the on-board electrical system 1B may include the detector 11 that detects the output-current value and the output-voltage value of the auxiliary battery 6.

The controller 10B may control the first switch SW1, the second switch SW2, the main DC/DC converter 8, and the sub DC/DC converter 9, on the basis of the detected value by the detector 11 and the detected value by the detector 21, and thereby realize a power feeding control as the second modification example described below.

Figure 8:
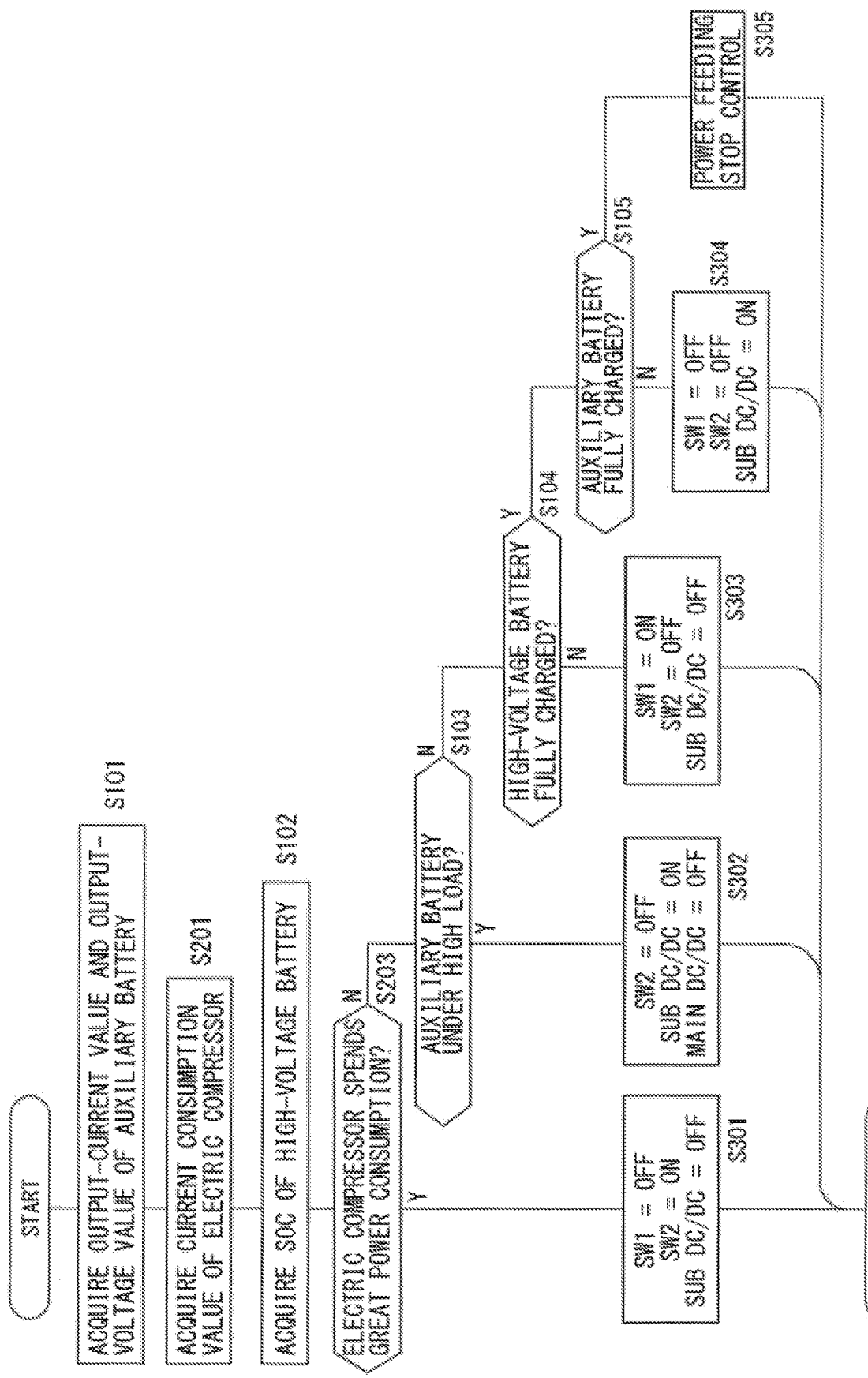
FIG. 8 is a flowchart illustrating power feeding control processing according to the second modification example of the second embodiment.

FIG. 8 is a flowchart illustrating power feeding control processing as the second modification example to be executed by the controller 10B.

First, the controller 10B may execute the processing of steps S101, S201, and S102 described above, to acquire the output-current value and the output-voltage value of the auxiliary battery 6, the current consumption value of the electric compressor 20, and the SOC of the high-voltage battery 3.

Thereafter, in step S203, the controller 10B may determine whether or not the power consumption of the electric compressor 20 spends great power consumption. In the case where the controller 10B determines that the electric compressor 20 spends great power consumption (step S203: Y), the controller 10B may proceed to step S301. In step S301, the controller 10B may execute a control of turning OFF the first switch SW1, turning ON the second switch SW2, and turning OFF the sub DC/DC converter 9.

This causes the power feeding from the electric power acquirer 4 to the electric compressor 20 in accordance with the case with the electric compressor 20 spending great power consumption.

At this occasion, turning OFF the first switch SW1 hinders the charging of the high-voltage battery 3 by the electric power acquirer 4. This makes it possible to reduce the loss of the power feeding from the electric power acquirer 4 to the electric compressor 20. Moreover, turning OFF the sub DC/DC converter 9 hinders the power feeding from the electric power acquirer 4 to the auxiliary subsystem 5. This also makes it possible to reduce the loss of the power feeding from the electric power acquirer 4 to the electric compressor 20.

In step S203, in the case where the controller 10B determines that the electric compressor 20 does not spend great power consumption (step S203: N), the controller 10B may proceed to step S103. In step S103, the controller 10B may determine whether or not the auxiliary battery 6 is under the high load. In the case where the controller 10B determines that the auxiliary battery 6 is under the high load (step S103: Y), the controller 10B may proceed to step S302. In step S302, the controller 10B may perform a control of turning OFF the second switch SW2, turning ON the sub DC/DC converter 9, and turning OFF the main DC/DC converter 8.

Thus, in the case where the electric compressor 20 does not spend great power consumption, when the auxiliary battery 6 is under the high load, the power feeding from the electric power acquirer 4 to the electric compressor 20 is hindered, with the second switch SW2 turned off (SW2=OFF). Instead, the power feeding to the auxiliary subsystem 5 is carried out, not from the high-voltage battery 3 but from the electric power acquirer 4, with the sub DC/DC converter 9 turned ON and with the main DC/DC converter 8 turned OFF (sub DC/DC=ON, and main DC/DC=OFF).

As is understood from the processing flow described above, in the case where the magnitude of the power consumption of the electric compressor 20 is equal to or greater than the predetermined magnitude, the controller 10B may cause electric power from the electric power acquirer 4 to be fed to the electric compressor 20, regardless of the magnitude of the load on the auxiliary battery 6.

This makes it possible to give priority to the power feeding from the electric power acquirer 4 to the electric compressor 20, rather than giving priority to the power feeding to the auxiliary subsystem 5, in accordance with the case where driving the electric compressor 20 involves a larger amount of electric power than driving the auxiliary machinery.

Hence, in the configuration in which electric power from the electric power acquirer 4 is able to be fed to the electric compressor 20 and to the auxiliary subsystem 5, it is possible to appropriately suppress the deterioration in the high-voltage battery 3 and prevent the occurrence of the shortage of the driving electric power of the motor generator 2.

Meanwhile, in step S103, in the case where the controller 10B determines that the auxiliary battery 6 is not under the high load (step S103: N), the controller 10B may proceed to step S104. In step S104, the controller 10B may determine whether or not the high-voltage battery 3 is fully charged. In the case where the high-voltage battery 3 is short of full charge (step S104: N), the controller 10B may proceed to step S303. In step S303, the controller 10B may perform a control of turning ON the first switch SW1, turning OFF the second switch SW2, and turning OFF the sub-DC/DC converter 9.

Thus, in a case where the electric compressor 20 does not spend great power consumption, the auxiliary battery 6 is not under the high load, and the high-voltage battery 3 is short of full charge, the first switch SW1 is turned ON, causing the charging of the high-voltage battery 3 by the electric power acquirer 4. At this occasion, turning OFF the second switch SW2 and the sub DC/DC converter 9 hinders the power feeding from the electric power acquirer 4 to the electric compressor 20 and to the auxiliary subsystem 5. This leads to the efficient charging of the high-voltage battery 3 by the electric power acquirer 4.

In step S104, in the case where the controller 10B determined that the high-voltage battery 3 is fully charged (step S104: Y), the controller 10B may proceed to step S105. In step S105, the controller 10B may determine whether or not the auxiliary battery 6 is fully charged. In the case where the auxiliary battery 6 is short of full charge (step S105: N), the controller 10B may proceed to step S304. In step S304, the controller 10B may perform a control of turning OFF the first switch SW1, turning OFF the second switch SW2, and turning ON the sub DC/DC converter 9.

Thus, in the case where the electric compressor 20 does not spend great power consumption, the auxiliary battery 6 is not under the high load, and solely the high-voltage battery 3 out of the high-voltage battery 3 and the auxiliary battery 6 is fully charged, turning ON the sub DC/DC converter 9 causes the power feeding from the electric power acquirer 4 to the auxiliary subsystem 5. That is, performed is the charging of the auxiliary battery 6 by the electric power acquirer 4.

At this occasion, turning OFF the second switch SW2 hinders the power feeding from the electric power acquirer 4 to the electric compressor 20. This leads to the efficient charging of the auxiliary battery 6 by the electric power acquirer 4. Moreover, turning OFF the first switch SW1 makes it possible to prevent the excessive charging of the high-voltage battery 3.

In step S105, in the case where the controller 10B determines that the auxiliary battery 6 is fully charged (step S105: Y), the controller 10B may proceed to step S305. In step S305, the controller 10B may perform the power feeding stop control. The power feeding stop control in this case may include performing a control of stopping the power feeding from the electric power acquirer 4 to the high-voltage battery 3, to the electric compressor 20, and to the auxiliary subsystem 5. In this specific but non-limiting example, the power feeding stop control may include bringing the electric power acquirer 4 to the operation stopped state.

Alternatively, in a configuration in which electric power acquired by the electric power acquirer 4 is also fed to the on-board electronic devices undepicted in FIG. 7, the power feeding stop control may include turning OFF the first switch SW1, the second switch SW2, and the sub DC/DC converter 9, without bringing the electric power acquirer 4 to the operation stopped state.

Performing the power feeding stop control in step S305 in the case where the high-voltage battery 3 and the auxiliary battery 6 are fully charged makes it possible to prevent the excessive charging of the high-voltage battery 3 and the auxiliary battery 6.

The controller 10B may terminate the processing illustrated in FIG. 8 in accordance with the execution of the processing of any one of steps S301 to S305.

As described, the on-board electric systems 1A and 1B according to the second embodiment include the motor generator 2, the high-voltage battery 3, the electric compressor 20, the electric power acquirer 4, and, respectively, the controller 10A and the controller 10B.

In one embodiment of the technology, the on-board electrical system 1A or 1B may serve as an "on-board electrical system". The motor generator 2 may serve as a "motor generator" configured to perform powering operation to drive one or more wheels of a vehicle, and configured to perform regenerative operation to generate electric power. The high-voltage battery 3 may serve as a "high-voltage battery" subject to charging with electric power generated by the motor generator, and configured to feed electric power to the motor generator engaged in the powering operation. The electric compressor 20 may serve as an "electric motor" configured to operate with the high-voltage battery as a power supply. The electric power acquirer 4 may serve as an "electric power acquirer" able to acquire electric power during travel of the vehicle, and able to feed acquired electric power to the high-voltage battery and to the electric motor. The controller 10A or 10B may serve as a "controller" configured to control power feeding from the electric power acquirer.

Further, the controller is configured to determine whether or not magnitude of power consumption of the electric motor is equal to or greater than predetermined magnitude. On the condition that the magnitude of the power consumption is equal to or greater than the predetermined magnitude, the controller is configured to allow electric power from the electric power acquirer to be fed to the electric motor.

Thus, in the case with the electric motor spending great power consumption, performed is the power feeding to the electric motor not only from the high-voltage battery but also from the electric power acquirer. This makes it possible to reduce the frequency of the take-out of the large amount of electric power from the high-voltage battery to the electric motor.

Hence, it is possible to suppress the deterioration in the high-voltage battery and to prevent the occurrence of the shortage of the driving electric power of the motor generator.

Moreover, in the on-board electrical system according to the second embodiment, on the condition that the magnitude of the power consumption of the electric motor is equal to or greater than predetermined magnitude, the controller may allow electric power from the electric power acquirer to be fed to the electric motor, regardless of whether or not the high-voltage battery is fully charged.

Thus, in the case with the electric motor spending great power consumption, electric power from the electric power acquirer is fed to the electric motor even if the high-voltage battery is short of full charge. That is, it is possible to provide even higher frequency of the power feeding from the electric power acquirer to the electric motor.

Hence, it is possible to enhance the effect of suppressing the deterioration in the high-voltage battery and the effect of preventing the shortage of the driving electric power of the motor generator.

Furthermore, in the on-board electrical system according to the second embodiment, on the condition that the magnitude of the power consumption of the electric motor is smaller than the predetermined magnitude, the controller may determine whether or not the high-voltage battery is fully charged. On the condition that the high-voltage battery is short of full charge, the controller may allow the electric power acquirer to charge the high-voltage battery.

This makes it possible to cause the power feeding from the electric power acquirer to the electric motor in accordance with the case with the electric motor spending great power consumption, and to allow the electric power acquirer to charge the high-voltage battery in the case with the high-voltage battery short of full charge.

Hence, it is possible to reduce the frequency of the take-out of the large amount of electric power from the high-voltage battery to the electric motor, and to appropriately switch the destination of the power feeding from the electric power acquirer in accordance with the state of charge of the high-voltage battery.

Furthermore, in the on-board electrical system according to the second embodiment, on the condition that the magnitude of the power consumption of the electric motor is smaller than the predetermined magnitude, when the high-voltage battery is fully charged, the controller may stop the power feeding from the electric power acquirer to the high-voltage battery and to the electric motor.

Hence, it is possible to prevent the excessive charging of the high-voltage battery.

Further, the on-board electrical system 1B according to the second embodiment may further include the auxiliary subsystem 5 and the sub DC/DC converter 9. The auxiliary subsystem 5 may include the auxiliary battery 6 and the ISG 7.

In one embodiment of the technology, the auxiliary battery 6 may serve as an "auxiliary battery" an output voltage of which is lower than an output voltage of the high-voltage battery. The ISG 7 may serve as "auxiliary machinery" to be fed with electric power by the auxiliary battery. The auxiliary subsystem 5 may serve as an "auxiliary system" including the auxiliary battery and the auxiliary machinery. The sub DC/DC converter 9 may serve as a "second step-down unit" configured to step down the output voltage of the electric power acquirer, and able to supply the stepped-down output voltage of the electric power acquirer to the auxiliary subsystem. The controller 10B may serve as a "controller" configured to allow electric power from the electric power acquirer to be fed to the auxiliary subsystem through the second step-down unit, regardless of the magnitude of the load on the auxiliary battery, on the condition that the magnitude of the power consumption of the electric motor is equal to or greater than the predetermined magnitude.

This makes it possible to give priority to the power feeding from the electric power acquirer to the electric motor, rather than giving priority to the power feeding to the auxiliary subsystem, in accordance with the case where driving the electric motor involves a greater amount of electric power than driving the auxiliary machinery.

Hence, in the configuration that is able to feed electric power from the electric power acquirer to the electric motor and to the auxiliary subsystem, it is possible to appropriately suppress the deterioration in the high-voltage battery and prevent the occurrence of the shortage of the driving electric power of the motor generator.

Moreover, in the on-board electrical system according to the second embodiment, on the condition that the magnitude of the power consumption of the electric motor is smaller than the predetermined magnitude and the magnitude of the load on the auxiliary battery is smaller than the predetermined magnitude, when both the high-voltage battery and the auxiliary battery are fully charged, the controller may stop the power feeding from the electric power acquirer to the electric motor, to the high-voltage battery, and to the auxiliary subsystem. Refer to step S305 in FIG. 8.

This hinders the charging of the high-voltage battery and the auxiliary battery in the case where the high-voltage battery and the auxiliary battery are in full charge.

Hence, it is possible to prevent the excessive charging of the high-voltage battery and the auxiliary battery.

Furthermore, in the on-board electrical system according to the second embodiment, the electric power acquirer may perform electric power reception from outside the vehicle, using electromagnetic induction.

Using electromagnetic induction makes it possible to perform the non-contact, large-capacity power reception from outside the vehicle.

Hence, it is possible to perform the highly efficient charging of the high-voltage battery using an external power supply, while eliminating various restrictions in the case of the contact type power reception. Moreover, enhanced charging efficiency leads to greater capacity of the high-voltage battery.

Furthermore, as described in the second modification example with reference to FIGS. 7 and 8, the on-board electrical system 1B according to the second embodiment may include the motor generator 2, the high-voltage battery 3, the electric power acquirer 4, the auxiliary subsystem 5, the main DC/DC converter 8, the sub DC/DC converter 9, the controller 10B, and the electric compressor 20.

In one embodiment of the technology, the motor generator 2 may serve as a "motor generator". The high-voltage battery 3 may serve as a "high-voltage battery". The electric power acquirer 4 may serve as an "electric power acquirer". The auxiliary subsystem 5 may serve as an "auxiliary subsystem". The main DC/DC converter 8 may serve as a "first step-down unit". The sub DC/DC converter 9 may serve as a "second step-down unit". The controller 10B may serve as a "controller". The electric compressor 20 may serve as an "electric motor" configured to operate with the high-voltage battery as a power supply.

The controller may determine whether or not the magnitude of the power consumption of the electric motor is equal to or greater than predetermined magnitude (e.g., step S203). On the condition that the magnitude of the power consumption is equal to or greater than the predetermined magnitude, the controller stops the charging of the high-voltage battery by the electric power acquirer, and allows electric power from the electric power acquirer to be fed to the electric motor (e.g., step S301).

According to the forgoing configuration, the on-board electrical system may include the second step-down unit configured to step down the output voltage of the electric power acquirer, and able to supply the stepped-down output voltage of the electric power acquirer to the auxiliary subsystem. This makes it possible to perform the power feeding to the auxiliary subsystem not only from the high-voltage battery but also from the electric power acquirer. The above-described control by the controller causes the power feeding to the electric motor not only from the high-voltage battery but also from the electric power acquirer, in the case with the electric motor spending great power consumption. This leads to the reduction in the frequency of the take-out of the large amount of electric power from the high-voltage battery to the electric motor.

Hence, it is possible to suppress the deterioration in the high-voltage battery and to prevent the occurrence of the shortage of the driving electric power of the motor generator.

Although some preferred but non-limiting embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

For example, in the forgoing description, the example is given in which the technology is applied to a vehicle as an HEV. The technology, however, is also suitably applied to a vehicle as an electric vehicle (EV) devoid of the engine 50.

According to the aspects of the technology, it is possible to provide an on-board electrical system that makes it possible to suppress deterioration in a high-voltage battery that supplies driving electric power to a motor generator, and prevent occurrence of shortage of the driving electric power of the motor generator, in a vehicle that is able to perform power feeding from the high-voltage battery to an auxiliary subsystem.

The controllers 10, 10A, and 10B illustrated in FIGS. 1, 4, and 7 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controllers 10, 10A, and 10B. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controllers 10, 10A, and 10B illustrated in FIGS. 1, 4, and 7.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. An on-board electrical system, comprising:
a motor generator configured to perform powering operation to drive one or more wheels of a vehicle, and configured to perform regenerative operation to generate electric power;
a high-voltage battery subject to charging with electric power generated by the motor generator, and configured to feed electric power to the motor generator engaged in the powering operation;
an electric power acquirer able to acquire electric power during travel of the vehicle, and able to feed acquired electric power to the high-voltage battery;
an electric compressor configured to adjust an interior temperature of the vehicle in response to receiving the electrical power via a relay switch from the high-voltage battery or the electric power acquirer;
an auxiliary subsystem including an auxiliary battery and auxiliary machinery to be fed with electric power by the auxiliary battery, an output voltage of the auxiliary battery being lower than an output voltage of the high-voltage battery;
a first step-down unit configured to step down the output voltage of the high-voltage battery, and able to supply the stepped-down output voltage of the high-voltage battery to the auxiliary subsystem;
a second step-down unit configured to step down the output voltage of the electric power acquirer, and able to supply the stepped-down output voltage of the electric power acquirer to the auxiliary subsystem; and
a controller configured to control power feeding from the high-voltage battery and from the electric power acquirer,
the controller being configured to determine whether or not a state of charge of the high-voltage battery is equal to or smaller than a first threshold and whether or not a power consumption of the electric compressor is greater than a second threshold, and
on a condition that the state of charge of the high-voltage battery is equal to or smaller than the first threshold and that a power consumption of the electric compressor is greater than the second threshold, the controller being configured to stop the power feeding from the electric power acquirer to the auxiliary subsystem through the second step-down unit, stop the power feeding from the high-voltage battery to the electric compressor, and to allow the electric power acquirer to charge the high-voltage battery and feed the electric power to the electric compressor.

* * * * *